United States Patent [19]

Gruenberg

[11] 4,451,699
[45] * May 29, 1984

[54] COMMUNICATIONS SYSTEM AND NETWORK

[75] Inventor: Elliot L. Gruenberg, West New York, N.J.

[73] Assignee: BroadCom, Inc., West New York, N.J.

[*] Notice: The portion of the term of this patent subsequent to Jun. 29, 1999 has been disclaimed.

[21] Appl. No.: 389,033

[22] Filed: Jun. 16, 1982

Related U.S. Application Data

[63] Continuation-in-part of Ser. No. 108,552, Dec. 31, 1979, Pat. No. 4,337,376.

[51] Int. Cl.³ .................... H04M 11/00; H04B 7/14; H04B 7/20; H04B 17/00
[52] U.S. Cl. ........................... 179/2 EB; 455/17; 455/20; 455/56; 455/62; 343/370
[58] Field of Search .............. 179/2 EB; 343/100 TD; 455/11-13, 15-17, 19-22, 25, 56, 62

[56] References Cited

U.S. PATENT DOCUMENTS

| | | | |
|---|---|---|---|
| 4,004,098 | 1/1977 | Shimasaki | 455/13 X |
| 4,292,685 | 9/1981 | Lee | 455/12 |
| 4,337,376 | 6/1982 | Gruenberg | 179/2 EB |

*Primary Examiner*—Aristotelis M. Psitos
*Attorney, Agent, or Firm*—Lieberman, Rudolph & Nowak

[57] ABSTRACT

A communications system and network wherein communications links between subscribers are established by retrodirective oscillating loops between each subscriber and a node station. Provision is also made for establishment of retrodirective oscillating loops between nodes so that remotely located subscribers can communicate. Information is transmitted between subscribers by using a mixing process in the node whereby information transmitted from one subscriber to a node is transferred to a carrier signal transmitted between nodes or between a second node and another subscriber. A sampling technique is also described for use in the node which greatly minimizes the amount of apparatus required to implement the mixing process.

10 Claims, 16 Drawing Figures

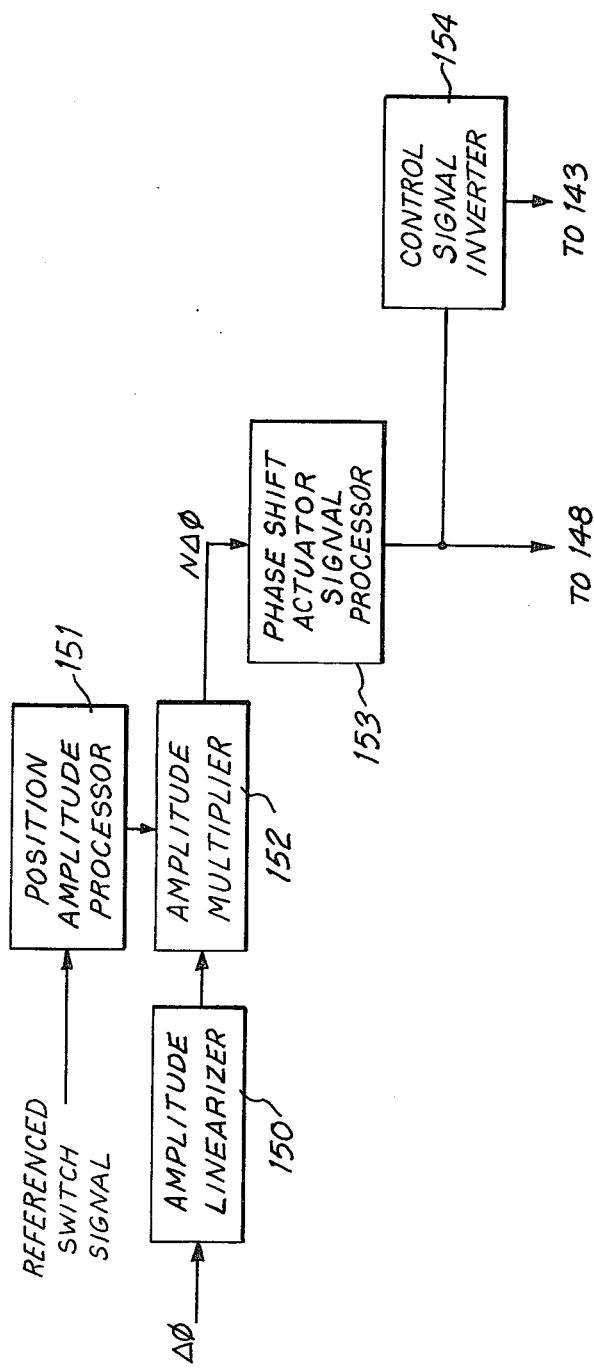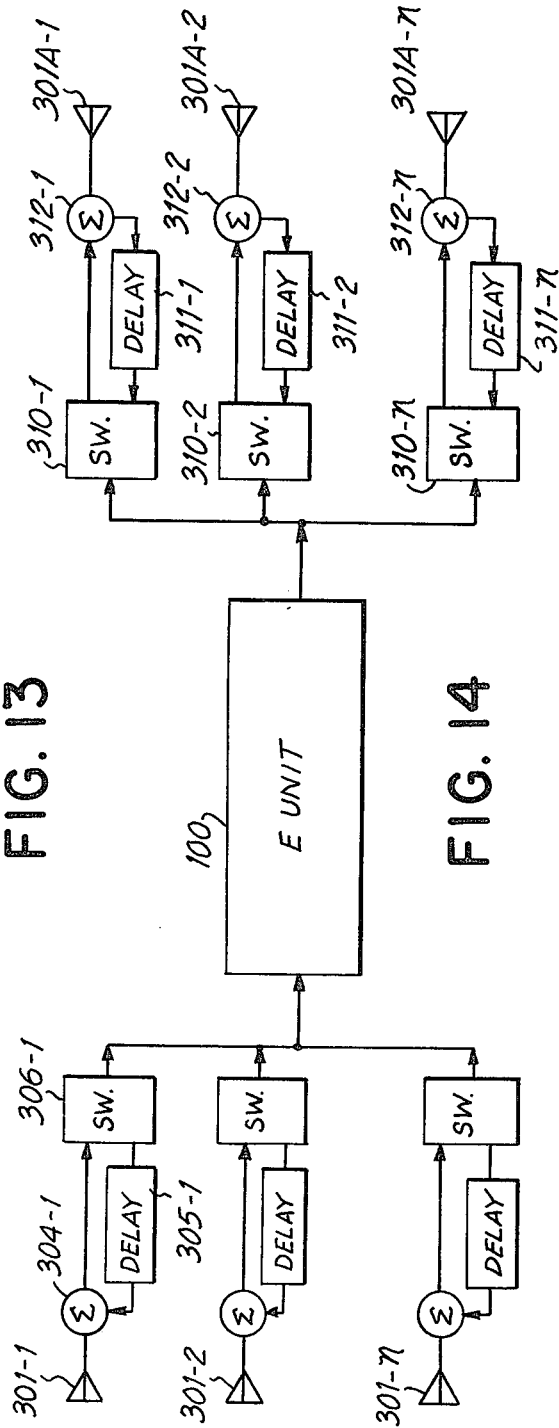

COMMUNICATIONS SYSTEM AND NETWORK

DESCRIPTION OF THE INVENTION

This is a continuation-in-part application of application Ser. No. 108,552 filed on Dec. 31, 1979 and issuing as U.S. Pat. No. 4,337,376, the disclosure of which is expressly incorporated herein by reference.

The invention relates to a communications and control system and network and in particular to a system and network that provides flexible communications and control between stations regardless of their spatial location or relative motion.

Present communication and control systems are used to transmit and receive voice conversations, business and computer data, radio and television programming and graphic material. In such systems, information may be exchanged by a central station and one or more subscribers or individual subscribers may exchange information with each other. Ideally, the communication and control system should be operative without regard to the particular spatial location of a subscriber at any particular time and should be operative to provide the means for exchanging information between subscribers who are either at fixed locations or who are moving spatially with respect to one another. Heretofore, fixed communication and control systems have been provided by the switched public network and by private or leased-line systems. In present mobile communication and control systems, subscribers utilize omnidirectional broadcasts to make contact with a base station that relays all communications between subscribers via omnidirectional broadcasting means.

These prior systems suffer from a number of serious drawbacks. For subscribers on a fixed system, the cost of central station switching equipment required to interconnect and direct calls and information is very high. Furthermore, the fixed systems rely on interconnecting subscribers via wire or cable and such interconnection means are presently bandwidth limiting as well as quite expensive in material and labor cost. Present mobile communications systems utilize omnidirectional radio broadcasting for base, relay and mobile stations thereby utilizing many frequencies over a general area. This omnidirectional broadcasting characteristic of present mobile system communications and relay stations drastically reduces the possible number of simultaneous users because each user requires one operating frequency for the area. One approach to increasing the possible number of simultaneous users in an area is to segment the area into cells with each mobile and relay station allowed low power limited range omnidirectional broadcasts. This approach, however, increases the cost and complexity of the mobile system and users must be switched as they move from cell to cell. Further increases in user demand require that the cells be made smaller and each station's transmitter reduced in power output.

These, and other problems are overcome by the present invention which provides a communication and control system and network that is divided into a fixed grid for the service area. When a user seeks a communication link with another user in the network, the system provides the means that allow a communications linkage to develop via radio frequencies between the calling and called station or stations through one or more nodes without the necessity of intermediate switching equipment and without regard to their spatial location or relative motion. The highly directional character of the individual links that form this communications and control linkage between communicating stations allows many other users in the same area to utilize the same frequency simultaneously without interference and to operate efficiently with greatly reduced power over that necessary for present mobile systems. Future increases in simultaneous user demand will be far better accomodated by this "space-linking" system and such capacity increases as are required can be met simply by upgrading the capacity of the network's relay stations or nodes.

The linkage between subscribers is established by the buildup of directional communications and control links known as retrodirective oscillating loops such as are described in U.S. Pat. No. 3,757,335, issued Sep. 4, 1973 to Elliot L. Gruenberg, the disclosure of which is expressly incorporated herein by reference. Briefly, U.S. Pat. No. 3,757,335 describes a retrodirective oscillating loop or link for a communication and control channel between a pair of remotely located antenna terminals. In accordance with the disclosure, a carrier signal for the retrodirective oscillating loop builds up between two remotely controlled antenna array terminals each of which has retrodirective properties when sufficient amplification is provided in the loop to overcome losses which occur at the terminals and in the medium between the loops. The retrodirective oscillating loop antenna beams automatically steer toward each other when each terminal is effectively within the field of view of the other and when the retrodirective antenna develops sufficient gain as each of its multiple radiating antenna elements transmits the carrier wave form in proper phase relationship to one another, which will automatically result when the loop gain is greater than unity.

In accordance with one aspect of the present invention, retrodirective oscillating loops are also set up between retrodirective relay stations or nodes such that communication paths can be readily established between a plurality of remote subscribers. An important feature of the invention is that the system does not require computation or knowledge of the location of the desired parties in order for a communications linkage to be established between subscribers. Another important feature of the invention is that switching equipment is not required on the nodes to establish or maintain the communications linkage between subscribers.

While some present day communication systems do not require switching equipment to establish communications between subscribers, these systems do require a large number of connections to insure that all subscribers can have access to all other subscribers in the system. One system which does not utilize switching equipment to establish connections between subscribers is described in U.S. Pat. No. 4,001,691 issued Jan. 4, 1977 to Elliot L. Gruenberg. While this system would provide good communications capability, it requires $n(n-1)/2$ connections, where n is the number of subscribers in the system.

In accordance with the system of the present invention, the complexity and cost of providing multiple paths for subscriber connections is substantially reduced since only a maximum of $n/2$ connections are required. In the present system, a connecting path is established by the calling party through a transponder at a central station, which will be referred to as a node, to the called party. Only one path is required between the calling party and the node and only one path between the node and the called party. Since the same path is used by both the called party and the calling party there will be no more than n/2 paths in use at any one time. There are, however, n channel designations, one for each party of the system who may at one time be a called party and at other times be a calling party.

Embodiments of the invention may be made utilizing any microwave or millimeter frequency allocation and may use satellite transponders. However, other frequencies may be used in some instances. Thus, communication channels may be of any desired or authorized bandwidth, for example, up to that which may accomodate high quality data or video information or combinations of video, data and voice. Elimination of intermediate switching greatly enhances the convenience and simplicity of the present system and eliminates potentially poor transmission paths.

While conventional directional microwave might be used for fixed communications, it cannot be used for mobile communications. The present system provides the flexibility to be used in fixed, mobile or combined fixed and mobile communications systems with increased transmission quality and greatly reduced cost due to the elimination of complex multiplex and switching equipment. The flexible directional aspects of the inventive system increase the capacity of communication systems in local areas by permitting different streams of data in different directions to utilize the same frequencies without interference. The flexibility of the system thus permits more users to use the same frequency channel allocations with lower power requirements.

In general, the communication system of the present invention connects users of the system by one or more two-way links or loops, through intermediary transponders or nodes. A control carrier having a characteristic control carrier frequency is assigned to each system user. The control carrier is a signal which does not contain intelligence or information (modulation) but which establishes the linkage between subscribers, enables modulation to be detected and which is used to direct the intelligence in specific directions and hence along specific paths. To use the system, the calling party selects a control carrier frequency which is complementary to the control carrier frequency of the called party. Selection of this control carrier frequency automatically enables a transmission path between the calling party and the called party. For a local node call, a retrodirective oscillating loop is established between the calling party and a local node (which functions as relaying station) and a second retrodirective loop is established between the local node and the called subscriber. For long distance communications, the calling party's local node is connected through intermediate nodes to the local node associated with the called party and a retrodirective loop between the called party's local node and the called party completes the communications link between the parties. In another embodiment of the invention, the station coupled to the called party's local node may be the terminus of another communication system, such as a public switched network, which is then used to complete the connection to the called party.

Considering the operation of the system in more detail, the calling party's terminal is equipped with a receiving antenna array, a transmitting antenna array, each array including the same number of antenna elements, an amplifier, and a band pass filter coupled between each element of the transmitter and a receiver antenna array which generates a control carrier having a preselected frequency. In practice a single array may be used by duplexing the receive and transmit connection to the same antenna element as is well known in the art. An oscillator in the terminal provides signals which serve as an offset between the receive and transmit signals and make possible the development of a retrodirective oscillating loop between the calling party's terminal and the calling party's local node, as is more fully described in U.S. Pat. No. 3,737,335.

The local node in accordance with the invention is equipped with a retrodirective array transceiver including receiving and transmitting antenna arrays. Through use of a unique sampling technique a mixer and a band pass filter are sequentially inserted in each of the paths connecting the receiver antenna elements, and the transmitting antenna elements in advance of the amplifier required to establish the retrodirective oscillation. The filter is chosen to pass only a reference signal centered at frequency 2c, where c is the frequency of the calling party's control carrier. The mixer provides this reference signal when it receives two complementary signals, the frequency of which are, for example $c+a$ and $c-a$. Thus, if the calling party provides a signal at one of these frequencies and the called party is set up to provide automatically a signal at the other frequency to the input of the local node, two simultaneous retrodirective oscillating loops will develop, one between the calling party and the local node, with the calling party supplying a signal to the node at frequency $c+a$ and the other between the called party and the node with the called party supplying a signal to the node at frequency $c-a$. In the node, the two signals are multiplied by the mixer to provide a reference signal at frequency 2c or a suitably translated frequency which is retransmitted back from the node to both the calling and called parties. Each subscriber is equipped to receive the reference signal and the loop is completed. Once the appropriate filter and local oscillator frequencies have been selected, it is only necessary to provide sufficient electronic and antenna gain to set up the loop gain conditions for retrodirective oscillations. Thus, as long as the node, retrodirective antenna and amplifiers at each terminal can support greater than unity loop gain, two retrodirective loops transmitting control carriers will develop, one between the calling party and the local node and one between the called party and the local node. The node provides a directional path to and from each party, i.e. the node retrodirective antenna will receive and transmit the control carrier signals in only the two general directions of the called and calling party's terminals. Similarly, the antenna of the called and calling party will receive and transmit in the direction of the local node irrespective of whether the parties are fixed or moving relative to one another. Once the retrodirective loops are established to interconnect the parties, information of any type can be exchanged between the parties.

Information originated at a calling subscriber station is transmitted in the form of radio frequency modulated signals to a node along with a carrier signal. From these signals which arrive in a fixed spatial phase relationship with respect to each other an information bearing signal is produced at the node which does not have any spatial phase relationship. This signal is transferred to the carrier signal of the called subscriber station by a mixing process. In this way the resultant signal contains the information bearing modulation of the calling station and the spatial phases of the called station. The node processes these phase relationships so that this composite signal will be transmitted by the node in the direction of the called station.

Communication between nodes is also provided through use of retrodirective oscillating loops. This method permits selective directional communication between nodes located at arbitrary orientations with respect to one another, the selective direction being entirely determined by the caller complementing a frequency characteristic of the called party.

These and other objects and features of the invention will be more fully understood by considering the following detailed description of the presently preferred embodiments of the invention when taken in conjunction with the following drawings wherein:

FIG. 13, illustrates, in block diagram form, a phase signal processor unit for use in the embodiment of FIG. 10, and FIG. 14 is a simplified block diagrammatic representation of an integrating sampling array node station in accordance with the instant invention.

Figure 1:
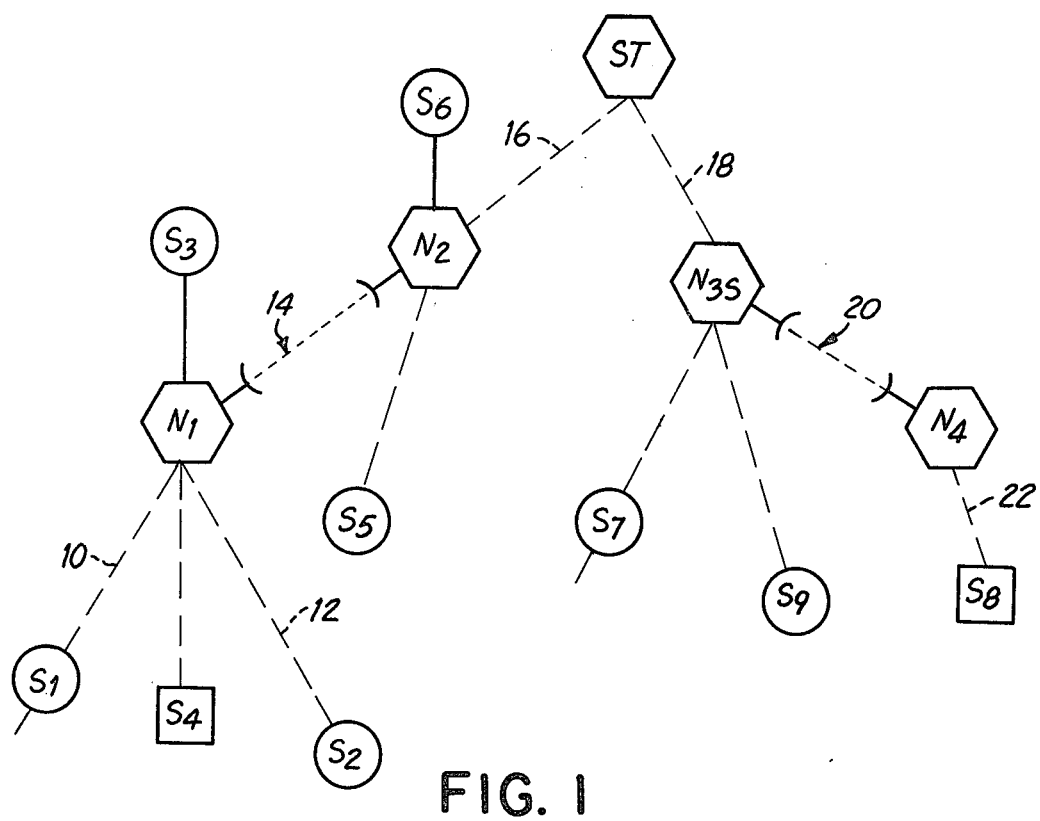
FIG. 1 is a block diagrammatic representation of the communication and control system of the invention illustrating a number of fixed and mobile subscribers interconnected through local and intermediate nodes.

Referring now to FIG. 1, a typical communications sytems according to the invention is shown. A number of subscribers $S_1$ through $S_9$ interconnected by fixed (indicated by solid lines) and mobile (indicated by dashed lines) transmission links with local nodes $N_1$ through $N_4$ or through satellite node ST. Each subscriber is located within the field of view of the antenna of a node which will be referred to as the local node of the particular subscriber. This relationship between subscriber and local node is indicated by the line connecting each subscriber to a node. Local communications are considered to be those in which both the called and calling subscribers are in communication via the same local node. For long distance communications, which is defined as communications between parties not communicating via the same local node, intermediate nodes are used. Communication between any two subscribers is accomplished through the establishment of complementary retrodirective oscillation loops between the calling party and the local node of the calling party, the called party and a local node of the called party and between any intermediate nodes necessary to establish the transmission path between the local nodes of the calling and called parties. If subscriber $S_1$ wishes to make a local call to subscriber $S_2$, subscriber $S_1$ selects a signal at the frequency complementary to the frequency of the signal automatically transmitted by subscriber $S_2$ and transmits that signal to node $N_1$ via, for example, mobile link 10. At the same time, node $N_1$ receives a signal at the complementary frequency from called party $S_2$ via mobile communication link 12. Node $N_1$ combines these signals and transmits a reference carrier signal to both parties $S_1$ and $S_2$. Retrodirective loops are thereby established between calling party $S_1$ and node $N_1$ and called party $S_2$ and node $N_1$ to provide a communications link between the parties. For long distance communications, for example, between calling subscriber $S_1$ and called party $S_8$ calling subscriber $S_1$ transmits a signal at a frequency complementary to the frequency automatically transmitted by subscriber $S_8$. This signal is received at node $N_1$ and transmitted via links 14, 16, 18 and 20 to Node $N_4$. In accordance with the instant invention links 14 through 20 may also be retrodirective loops as will be described in greater detail below. Node $N_4$ also receives the complementary signal from called party $S_8$ It generates the reference signal to parties $S_8$ via link 22 and via links 12 through 20 and in nodes $N_{3S}$, ST, $N_2$ and $N_1$ back to party $S_1$ to establish communication. Node $N_{3S}$ has the additional capability of extracting and inserting intelligence at its location for use of subscribers there, as well as relaying signals to the other points in the network.

When the communication paths between the subscribers have been established, transfer of information between subscriber stations $S_1$ and $S_8$ can take place. The modulated signal from $S_1$ is designated $\Delta$ west for convenience. The $\Delta$ west signal is transmitted from subscriber $S_1$ to node $N_4$ where it is transferred to the carrier from subscriber $S_8$. Similarly, signals from subscriber $S_8$ modulated with $\Delta$ east modulation are transmitted to node $N_1$ and are then transferred to the carrier signal from subscriber $S_1$.

Figure 2:
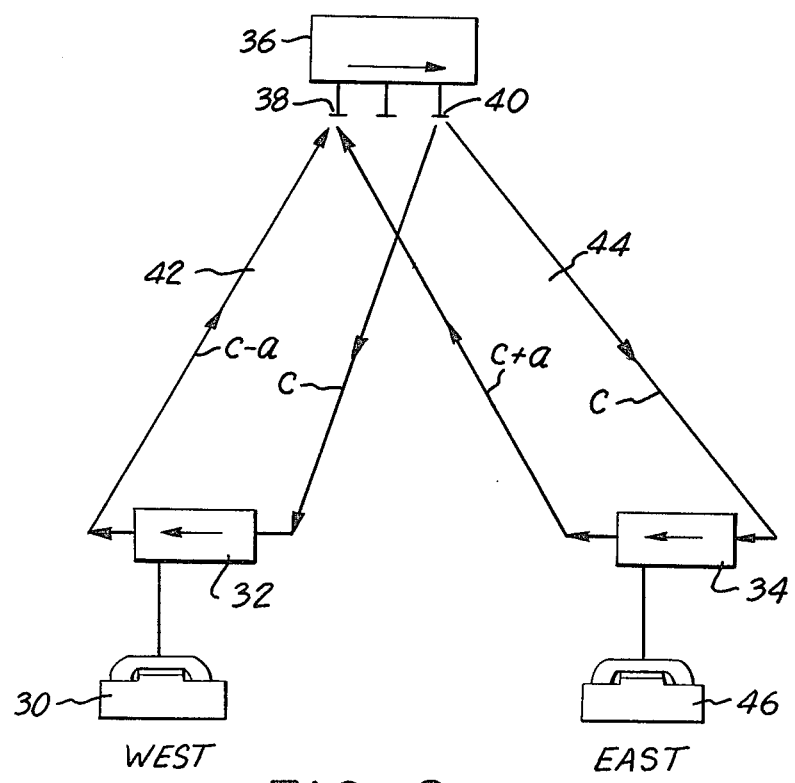
FIG. 2 is a simplified block diagrammatic representation of a single node system servicing one pair of subscribers and operating in a full duplex mode.

The system operation can be further understood by considering first the operation of the simplified illustrative system shown in FIG. 2 in which a pair of subscribers communicate via a single local node. For the purpose of explanation, assume that the called party, which will also be referred to as the East party, is assigned a called frequency of $c+a$, where c is the reference frequency and a provides an offset from the reference frequency unique to the East party. The calling party will be referred to as the West party. To place a call from the West party to the East party, the West party takes his phone 30 off hook and dials a number code which identifies the East party. The number code is received in the West party subscriber station 32 which translates the code into a local oscillator or a filter adjustment which enables a retrodirective loop to operate at a control carrier frequency $c-a$. The West control carrier signal at frequency $c-a$ and the complementary control carrier signal provided by the East subscriber station 34 at frequency $c+a$ are received in node 36 via antenna elements 38. At the node 36, the complementary control signals are combined and utilized to generate a reference carrier signal at frequency c, which is transmitted back to both the East and West parties via antenna elements 40. In this manner a communications link including two retrodirective loops, 42, 44 one between each party and node 36 is established between the parties.

It should be understood that this system does not employ independent receivers and transmitters as do conventional systems but instead, a control carrier path is established between receiving and transmitting elements of the party's subscriber stations and the node by virtue of the operation of retrodirective loops. As shown in FIG. 2, retrodirective loops are established between West party 30 and node 36 and East party 46 and node 36. Node 36 is constructed to permit communication between the parties only when complementary control carrier signals are present.

These control carrier signals are enabled by providing both loops with sufficient electronic amplification and antenna focusing power to provide greater than unity gain around each loop at the desired frequencies to overcome all losses. Thus, two simultaneous retrodirective oscillating loops 42, 44 will be developed ready for information to be transferred between the parties. Furthermore, all the links will be directional at both ends. Therefore, information transferred in one direction will not interfere with information transfer in other directions.

When both retrodirective loops 42, 44 are established, the signaling bell in the East party receiving instrument 46 will be actuated and the East party completes the connection by taking his phone off hook. Both parties may now use the links which have been established to transfer information between the East and West subscribers via node 36.

Information is modulated on the carrier now existing in West subscriber station 32 and is transmitted to node 36 where the retrodirective array carrier from the East station 34 is now also present. Node 36 differentiates the two carriers by their carrier frequency and also establishes the direction of the carriers by the distribution of spatial phase angles on the individual array antenna elements.

The node removes the modulation from the West carrier by a process described in more detail below and inserts it on the carrier returning to the East station 34. At the same time and by the same process the modulation from the East station is removed from the East carrier and inserted upon the West carrier being retransmitted to the West station 32. The simultaneous modulations will not interfere with each other. When the communication is complete, each party goes back on hook. The oscillator in each terminal 32, 34 is automatically returned to the assigned called control carrier frequency unique to the party. All stations are, in effect, in a ready state and emit a low level noise-like signal to the node 36 which includes energy at the party's assigned frequency. The party is again signalled when the node 36 receives a signal at a frequency complementary to the party's assigned frequency which causes the establishment of respective retrodirective loops between the parties and the nodes.

Figure 3:
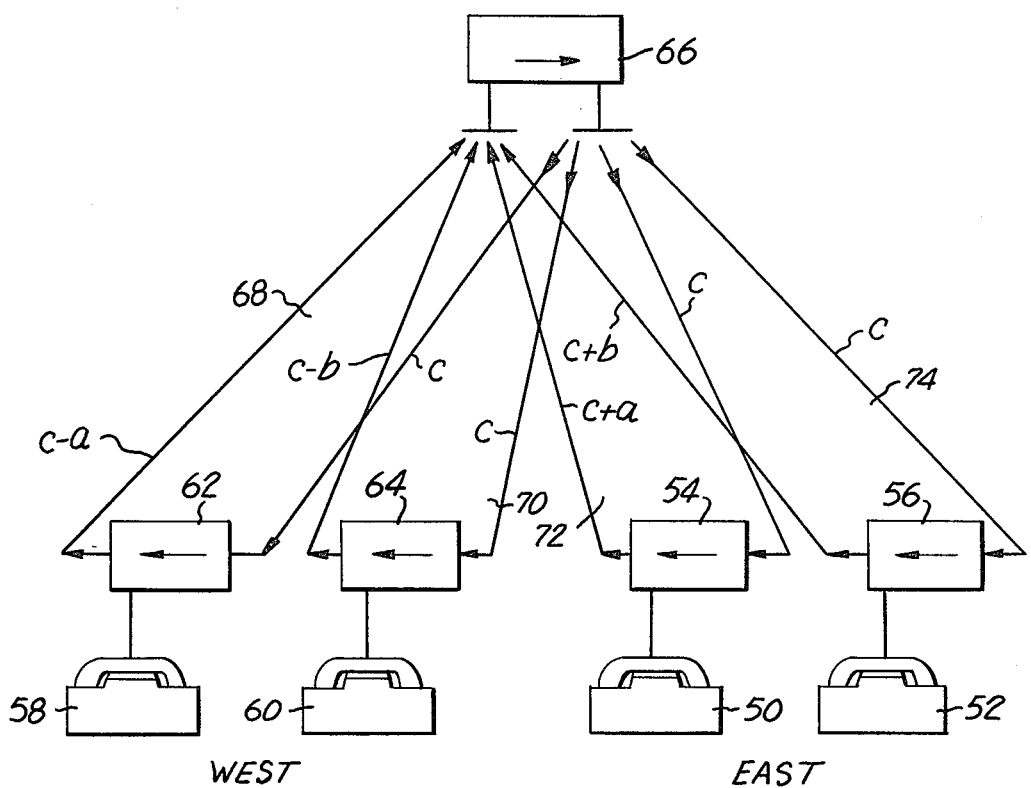
FIG. 3 is a simplified block diagrammatic representation of a single node system servicing two pairs of subscribers stations.

FIG. 3 shows the operation of the system with four parties communicating through a local node. In FIG. 3 there are two East parties 50, 52 having subscriber stations 54, 56 respectively, and two West parties 58, 60 having subscriber stations 62, 64 respectively, communicating with local node 66 via separate communication channels established in the node. For this description, we assume that subscriber 58 wishes to call subscriber 50 and subscriber 60 wishes to call subscriber 52 and that the calls are placed simultaneously. Subscribers 58 and 60 go off hook, dial the code number, then generate and transmit to node 66 control carrier signals at frequency $c-a$ and $c-b$ which are complementary to the frequencies assigned to subscribers 50 and 52. Also received at node 66 are noise signals transmitted from subscriber 50, 52 which noise signal spectral energy includes complementary frequencies of $c+a$ and $c+b$ respectively. Frequencies $c+a$ and $c+b$ are sufficiently separated to be filtered by separate band pass filters in node 66. The width of this separation also affects the build-up time of the control carrier signal since too narrow a band pass filter would delay the build-up excessively. For this reason, a minimum separation of 1,000 hz is recommended. This filtering sets up separate paths in node 66 for the control carrier signals received from subscribers 58 and 60. In node 66, the complementary carrier signals are combined and mixed to provide a common signal which passes a bandpass filter centered at frequency 2c. This signal is used to generate a reference carrier signal at frequency c which is then transmitted back to each subscriber to establish retrodirective loops 68, 70, 72 and 74 between the subscribers and node so long as there is more than unity loop gain between each pair of subscribers. Subscribers 58 and 50 and subscribers 60 and 52 are connected via separate communications channels, since the independent paths provided in node 66 permit the four retrodirective loops 68, 60, 72 and 74 to operate simultaneously. In fact, a multitude of such retrodirective loops may operate simultaneously and independently, provided sufficient independent paths are provided in the node. As should now be apparent, these paths or channels can be easily established by providing an independent band pass filter in the node on each channel and by proper selection of the control carrier frequencies for each channel. Modulation may be originated at one station and received at the other station of the pair without interference so long as independent control carrier frequencies are provided for each subscriber. No interference will be experienced by the subscribers so long as the corresponding East and West subscribers all do not lie within the same beam width of the nodes even though the pairs use the same modulation channel allocation. This occurs because the node is made up of an array of individual antenna elements each of which selectively includes a processing unit which will be discussed in greater detail. The processing unit is capable of suppressing modulation from a direction substantially different from the direction of the carrier developed from the terminal at a given direction as will also be discussed later.

Modulation originating from and/or transmitted to directions substantially within the same beam width of the node will require a different modulation channel to avoid interference. However, subscriber stations may be assigned different combinations of control carrier and modulation frequencies so that even if subscribers are mobile and move from beam to beam, interference is minimized. For example, if the number of stations is S and the number of beam positions (control carriers) is C and the number of modulation channels is M, then the number of modulation channels (frequency assignments required) is $M=S/C$; and if M equals C, M equals $\sqrt{S}$. Thus, 10,000 users may be accommodated with only 100 channels and at least 100 users may use each beam simultaneously. Only 1% of the channel allocation would be required as opposed to assigning each station a frequency as has been heretofore required. Thus significant savings in band width and/or significant increases in system capacity are readily achieved.

Figure 4:
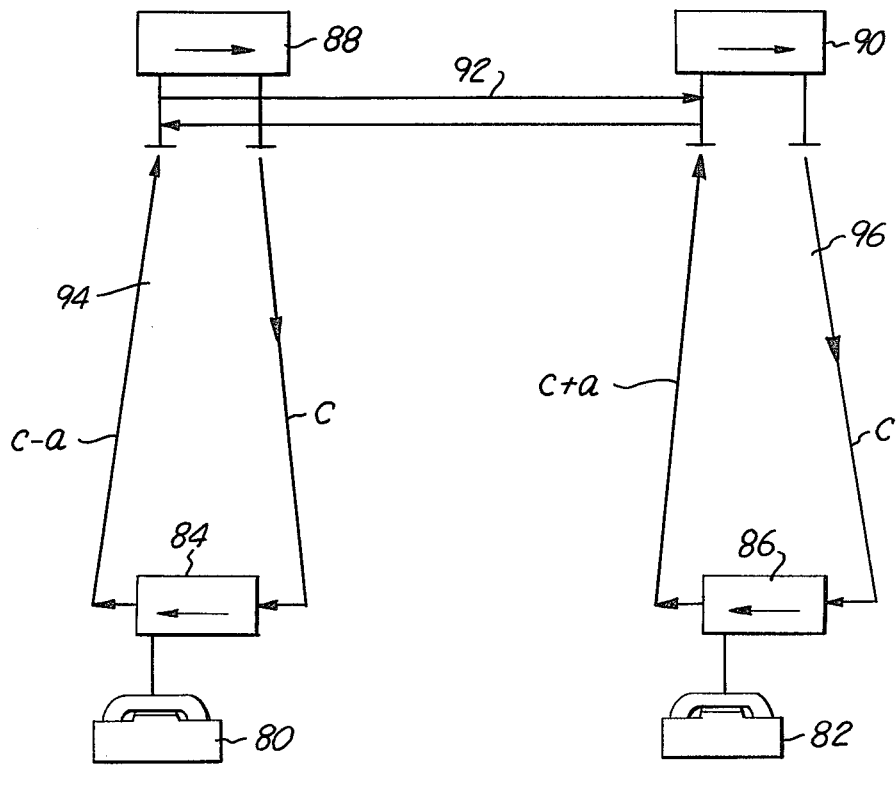
FIG. 4 is a simplified block diagrammatic representation of a two node system which illustrates the operation of the system with remote subscribers.

FIG. 4 illustrates how remote subscribers may use the system. Remote subscribers are those which do not share the same field of view of a single node but must be reached via two or more nodes. In such a case, intermediate retrodirective loops between nodes must be established. Thus, if subscriber 80 wishes to call subscriber 82, subscriber 80 adjusts the frequency transmitted by subscriber unit 84 in the same way as described above to generate the control carrier signal at frequency $c-a$ which is complementary to the tuned frequency of subscriber unit 86 associated with subscriber 82. Node 88 receives the control carrier at frequency $c-a$ and is equipped with an array of antenna elements and associated phase coupling units which permit control carrier signals received by node 88 to be transmitted to node 90 (or any other node within the field of view of node 88) via communications channel 92 which is a retrodirective loop as will be described in detail below. In essence, node 88 upon receiving a control carrier signal automatically attempts to find the subscriber anywhere in the system which is set up to generate the complementary control carrier signal. In the systems of FIG. 2 and 3, the subscriber was found coupled to a local node. In the system of FIG. 4, the node had to seek the desired subscriber at a distant node. This operation would automatically take place through as many intermediate nodes as would be required to establish a connection between subscribers. FIG. 4 shows the use of two nodes for illustrative purposes only. At node 90, a noise signal generated by subscriber 82 and continuing frequency $c+a$ is received, applied to the input of node 90 and also transmitted to node 80 via link (retrodirective loop) 92. Receipt of the complementary signal in node 88 enables the signal to pass through node 88 and provides a reference signal at frequency c, which is transmitted to subscriber station 84. Similarly, a signal at frequency $c-a$ from node 88 originating in subscriber station 84 complements a signal at frequency $c+a$ received at node 90 from subscriber station 86 enabling the signal at frequency c to be sent to subscriber station 86 to complete the loop. Retrodirective loops 94, 96 and 92 are enabled by sufficiency of gain around each loop offsetting any losses including those incurred in paths 92, 94 and 96. Modulation from subscriber station 84 can now be transferred to the control carrier at frequency c in node 90 and transmitted to subscriber station 86. Similarly, modulation can be transferred to carrier c from node 88 directed to subscriber station 84.

Figure 5:
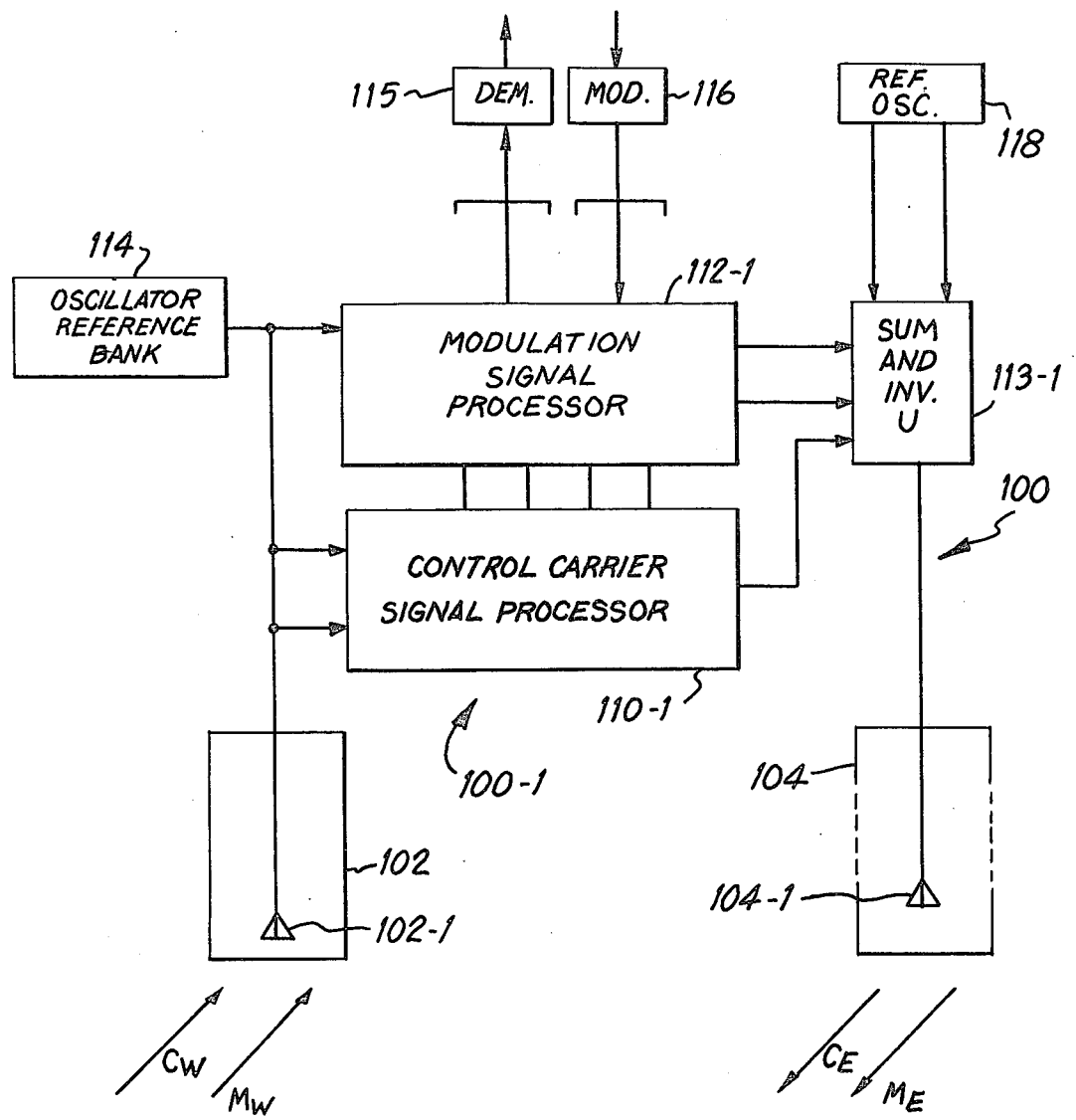
FIG. 5 is a block diagrammatic representation of a typical single element of a node in the communication system for establishing the connection and for receiving and transmitting information between a calling and called subscriber.

For a first embodiment of the invention the typical node 100 of the system (examples of nodes are $N_1$, $N_2$, $N_3$s of FIG. 1, 36 of FIG. 2, 66 of FIG. 3, 88 and 90 of FIG. 4) is composed of one or more identical node elements. FIG. 5 shows such a typical node element for a first embodiment of the invention, referred to as 100-1. Each such node may contain n node elements each comprising circuitry, but as described in greater detail below the preferred embodiment is for each node to contain one node element for a plurality of antenna arrays. The series of elements will be referred to as -1, -2 .... The node elements (100-1, 100-2 ... 100n) may all be connected to a common single oscillator unit 118 which is required to invert the spatial phases of signals for retransmission back to the terminal units to complete the retrodirective oscillating loops. Each node includes a receiving antenna 102 and a transmitting antenna 104; each node element includes, for example antenna elements, 102-1 and 104-1 respectively. When the physical spacing between antenna elements 102-1 .. . n and 104-1 ... n are properly spaced (usually less than 0.9 of the wavelength of the frequency being received or transmitted by the node) the energy received or transmitted will be concentrated into discrete beams in accordance with the well known principles of operation of phased arrays. These beams will be directed in accordance with the repetitive phase differences received at the different elements 102-1, 102-2, 102-3 ... 102-n. We will refer to this phase difference from the West station as $\emptyset$ and that from the East station as $\theta$.

Each node element 100-1, 100-n may be equipped to handle "m" duplex channels. To do so each node must be equipped with duplicates of modulation signal processor 112 and control signal processor 110. By duplex channel is meant a channel connecting two terminals (stations or subscribers) which can carry information simultaneously from each terminal to the other. Each such channel requires a different set of complementary frequencies. The following description describes the functioning of a single duplex channel. The operation of multiple channels can then be readily inferred from the description of one channel.

The numbers of node elements 100-1, 100-2, 100-3 .. . 100-n which may be used in a given node is dependent primarily on the number of desired independent beam directions. The particular dependency is determined by the type of phased array used, but in the case of planar arrays "n" node elements may be used for "n" beam directions within the field of view of the array. The field of view of the array is the angular volume over which signals may be received from and transmitted to the node from the stations and is principally determined by the element antenna pattern of 102 and 104. (Other arrays which can be used include spherical and cylindrical arrays. These arrays have wider field of views than the planar array). An example situation would be a node field of view of 60° and a node beam width of 6° indicating 10 independent beam directions within the node field of view. Thus 10 terminal stations may use the same frequency band without any interference whatsoever when they each are located in a different beam. Also each user will receive the benefit of the antenna gain implied by the narrow 6° beam. This greater gain permits a higher information transfer for the same transmitted power and a distance between node and user.

The local node 100 is capable of providing multiple communication channels for communications among subscribers within the field of view of the node, the field of view being the angular sector over which node element antennas 102-1 ... n and 104-1 ... n can physically receive and transmit, and between remote subscribers, which are subscribers not within the field of view of a single local node. Signals from local subscribers in direct communication with node 100 are received by receiving antenna 102-1 ... n and transmitted to these subscribers by transmitting antenna, 104-1 ... n. These antennas receive directionally from subscribers at arbitrary directions with respect to the antenna and transmit to the subscribers in the corresponding directions. For communications between remote subscribers, additional retrodirective loops are established to receive and transmit signals from other nodes as will be described in more detail below.

FIG. 5 shows a single node element 100-1 including single antenna elements 102-1, 104-1, control carrier signal processor 110-1 and modulation signal processor 112-1. These elements work cooperatively to generate the complementary retrodirective loops and to transfer information to the complementary stations which communicate with each other. In accordance with one embodiment of the invention described herein one set of processors, 110 and 112, can be utilized for a plurality of transmission paths with a sampling technique that will be described in general detail below. The West originating control signal for the first node element will be referred to by the notation "$C_{wl}$". The West originating modulation signal for the first node element will be referred to by the notation "$M_{wl}$". The East originating signals will be referred to by the subscript "E". The "nth" element will be referred to by the notation n.

Antenna element 102-1 receives West control and modulation signals $C_{wl}$, $M_{wl}$, respectively, at a spatial phase angle with respect to a reference point, $\emptyset_1$, whereas East control and modulation signals $C_{E1}$, $M_{E1}$ are received at spatial angle of $\theta_1$. Similarly, antenna element 102-n receives signals $C_{Wn}$ $M_{Wn}$ at an angle $\emptyset_n$ and $C_{En}$, $M_{En}$ at an angle $\theta_n$.

For the embodiment of the invention shown in FIG. 5, control carrier signal processor 110-1 operates with one set of antenna elements 102-1 and 104-1. Hence, in FIG. 5 there are n control carrier signal processors, for each channel. Similarly, modulation signal processor 112-1 operates with one set of antenna elements 102-1 and 104-1. Hence, for the embodiment of the invention shown in FIG. 5 there are also n modulation signal processors for each channel.

Receiving antenna 102 is coupled to control carrier signal processor 110, which processes carrier control signals $C_E$ and $C_W$ received respectively from the East and West subscribers between which communication is to be, or is established. As explained above, the frequency of signal $C_{E1}$ (equal to c+a) is complementary to the frequency of signal $C_{W1}$ (equal to c−a). When the signals are combined in control carrier signal processor 100-1 they yield a signal whose frequency is 2c. If the spatial phase of signal $C_{W1}$ at a given element of antenna 102 is $\emptyset_1$ and the spatial phase of the signal $C_{E1}$ at antenna 102 is $\theta_1$ then the spatial phase of the resulting signal $\emptyset_1 + \theta_1$. Spatial phase is used herein to mean the phase of the sine wave radio frequency signal received at one location within the node with respect to the phase of a signal received at another reference location within the node. For convenience, the frequency of the resulting signal is translated to reference frequency c in the control carrier signal processor 110-1. The resultant reference carrier signal at reference frequency c is transmitted via antenna 104 to both the calling and called subscribers.

Wherever carrier or modulation signals are referred to, a simplified notation will be adopted. Instead of referring to a signal as $Ae^{j(c-a+\Delta West)t+\emptyset}$, for simplicity it will be referred to only by the exponential term. Thus, the above signal would be referred to as c−a+Δ- west+$\emptyset$. The reference to time, t, is dropped because it is not needed for the explanation. Δ west is equivalent to $M_w$ when the modulation is in the form of phase or frequency modulation. While the description shows how the system works when using exponential modulations (phase or frequency), the system will also work with amplitude modulation.

Inverter 113-1 receives input from oscillator 118, inverts the spatial phases of the signals received from elements 102 before transmission via antenna 104 as described more fully below. Two retrodirective oscillating loops are established simultaneously, one between the calling subscriber and the calling node, and the other between the called subscriber and the called node, provided that the loop gain in each path exceeds unity and that at the frequency of operation, the net phase shift around the loop is zero or a multiple of 360 degrees. Part or all of the required gain can be provided by control carrier signal processor 110 as will be described in more detail below.

Information signals are received and transmitted via separate modulation channels. Modulation received via antenna 102 is processed in modulation signal processor 112 which receives modulation from both the calling and called subscribers and uses control carrier signals $C_W$ and $C_E$ received from control carrier signal processor 110 to provide signal products for redirection to the complementary user i.e. modulation from the West subscriber is retransmitted only to the called subscriber, East, via control carrier $C_{E1}$ as will be described in more detail hereinafter.

Modulation signal processor 112 also provides modulation output to the node and receives modulation for retransmission from the node when there are subscribers located at the node or when connection to an external communications system, such as the public telephone network is desired. In the latter case, a signal at frequency c+a is provided to the control carrier signal processor 110 from oscillator reference bank 114. This signal, together with a complementary control signal $C_W(c-a)$ received from a west calling subscriber either within the field of view of the node, or from a distant node, will develop a signal with frequency 2c in control carrier signal processor 110 to be used to generate a control carrier of frequency c for transmission back to the stations and thus enable a retrodirective oscillating loop to exist between the node and the calling or called party. Demodulator 115 and Modulator 116 are provided to extract the intelligence signals destined for the node location and to insert intelligence for transmission to the specific subscriber.

In the patent application Ser. No. 108,552 filed Dec. 31, 1979, now U.S. Pat. No. 4,337,376, the system node stations provided communications between subscriber stations within the field of view of the local node (via retrodirective loops) and also provided directional communication links between node stations so that subscriber stations associated with a first local node could communicate with subscriber stations associated with a second local node. The instant application describes a node station for use with the system of the parent application which has been improved in two ways. First a new method is provided for communicating among node stations. The new method permits selective directional communications between nodes at arbitrary orientations with respect to one another via retrodirective loops, the selective direction being entirely determined by the caller complementing a frequency characteristic of the called party. The second improvement reduces the number of signal processing packages (110 and 112 along with their associated circuitry) to one per communication channel per node rather than one per communication channel per antenna element as was required in the parent application. This is achieved by a sampling method which provides sequential connection of a communication package to each antenna element at a rate sufficently high so as not to affect the modulation passing through the node. The internodal communication improvement will be addressed first.

Figure 6:
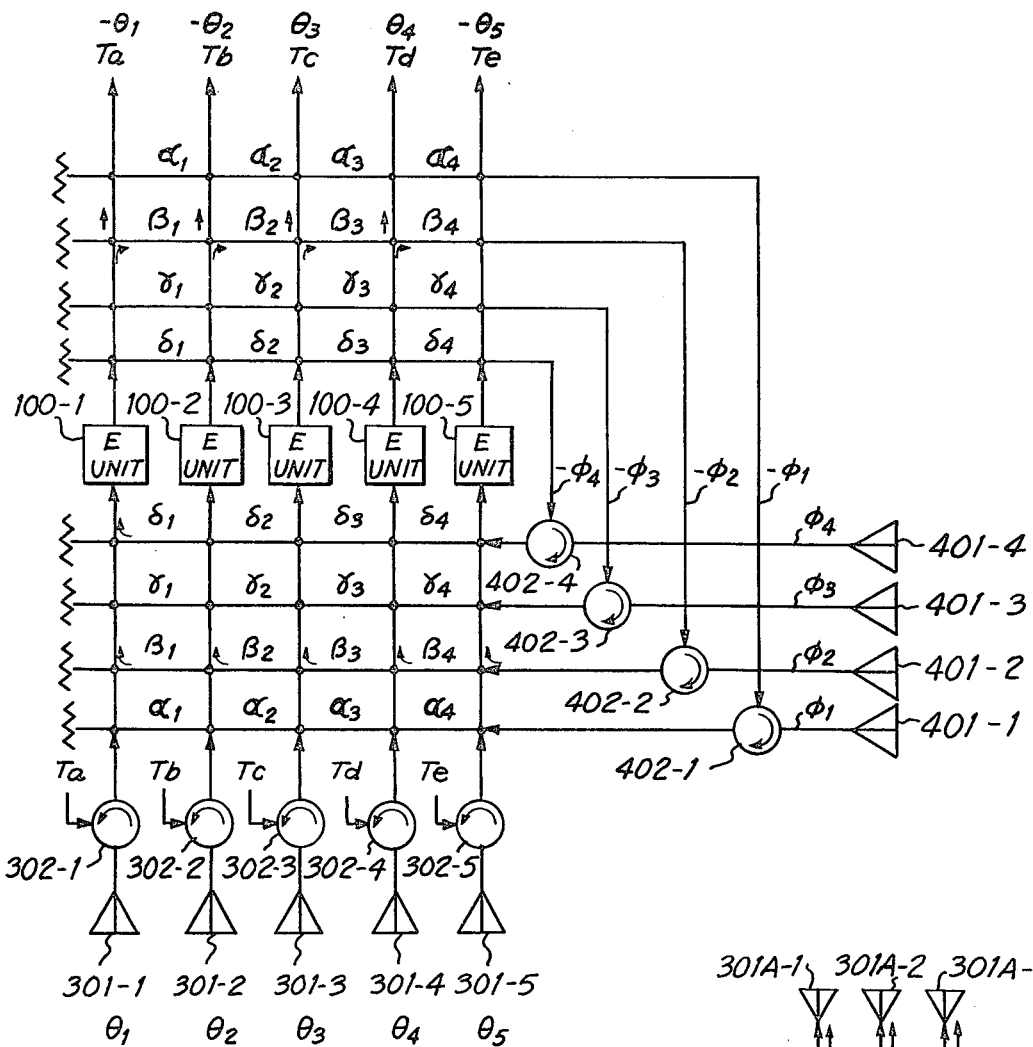
FIG. 6 is a simplified block diagrammatic representation illustrating the principles of operation for retrodirective linkage between local and remote node stations.

Referring now to FIG. 6 there is shown an improved node station which is capable of receiving and transmitting energy from/to local stations ($S_1$ and $S_7$, FIG. 1) and also from/to remote stations ($S_1$ and $S_2$, FIG. 1) via other nodes connected by retrodirective loops. More particularly, local subscriber stations are connected to a node via antenna elements 301-1 through 301-$n$, of which antenna elements 301-1 through 301-5 are shown. Communication between nodes is accomplished via antenna elements 401-1 through 401-$n$, of which antenna elements 401-1 through 401-4 are shown.

Duplexers 302-1 through 302-5 permit each element of the local antenna array to receive and transmit energy and also provide isolation between signals received from a subscriber station from signals transmitted to a subscriber station and denoted as $T_a$ through $T_e$. Additional isolation may be provided by receiving and transmitting on different frequency bands. Duplexers 402-1 through 402-4 provide the same function for the internodal or remote antenna array, 401-1 through 401-4.

Electronic Units (E-Units) 100-1 through 100-5 convert, channel filter, amplify, signal process and phase invert signals received from element pairs of the two antenna array systems and supplies these signals to corresponding local and internodal antenna array elements. The E-Units operate in the same manner as processors 110 and 112, along with their associated circuitry, described above and also described in greater detail in the parent application. In a further embodiment of the invention, sampled array nodes, to be described later, require only one E-Unit to be used for each communication channel per node, and the E-Unit is switched from one antenna array pair to another.

The improved node shown in FIG. 6 will handle a large number of signals received at the same time from different subscriber stations and node stations. These several signals result in various distributions of phases $\theta_1$, $\theta_2$, $\theta_3$, $\theta_4$, $\theta_5$ on the local station antenna system 301-1 through 301-$n$ and other distributions of phases $\emptyset_1$, $\emptyset_2$, $\emptyset_3$, $\emptyset_4$ on the internodal antenna system 401-1 through 401-$n$. Phase differences of predetermined amount will then exist along lines connected to antennas 401-1 through 401-$n$, such as phase differences $\beta_1$, $\beta_2$, $\beta_3$, and $\beta_4$, which exist on the connection to antenna 401-2 (receive). The same phase differences $\beta_1$, $\beta_2$, $+\beta_3$, and $+\beta_4$ also exist on the transmit line connected to antenna 401-2.

The operating principle of this embodiment of the invention is best understood by considering first what happens when a single local subscriber station is using the node station and is connected to a remote subscriber station at a remote station node. In such a case, $\theta_1'$ $\theta_2'$ $\theta_3'$ $\theta_4'$ represent the spatial phases of the signals $c+a+\Delta \text{east}+\theta n$ received from local stations. Each of these signals is fed directly to an E-unit 100$n$. At the same time, signals are also received from the remote node station. Typically, Eunit 100-1 would receive from the remote node station a signal comprising $c-a+\Delta\text{west}+\emptyset n-(B_1+B_2+B_3+B_4)$. When this happens the signals are combined such that the output of the Eunit will be $c-a+z+\Delta\text{west}-\theta$, and $c+a+z+\Delta\text{east}-\emptyset_2+(B_1+B_2+B_3+B_4)$ where Z represents an offset frequency between transmit and receive signals. These signals are developed, in accordance with the operating principles described in the parent application, because the two input signals are complementary in carrier frequency. Also the first signal is phased properly to return to the local station in phase with other signals from other elements of the local array 301-$n$ as will be described in greater detail below.

The second signal produced by E-unit 100-1 has two phase components, $-\emptyset_2'$ and the positive sum of the arbitrary phases $\beta_n$. This second phase component, being the negative of the phases received from the corresponding internodal array element 401-2, will arrive at duplexer 402-2 in phase for transmission along with energy originating at the same antenna element 401-2, but after travelling through E units 100-2, 100-3, 100-4, 100-5. Since these signals have been advanced by E-unit signal processing by the same amount that they had been delayed in phase in the receive line, the phase delay in the transmit line is just sufficient in each path to bring all signals originating at 401-2 back in additive phase for transmission.

Signals originating at other antenna elements such as 401-3 will not return in phase to 401-2 because phases $S_1$ through $S_4$ do not match phases $\beta_1$ through $\beta_4$. The disparity in phase can be made arbitrarily large by adjusting these phase delays to be very dissimilar. Thus, the signal returned to the element 401-2 is $c+a+z+\Delta\text{east}-\emptyset_2$ which will return to the remote node in phase with other transmissions from the other elements of internodal array 401-$n$. In this manner internodal array 401-$n$ acts retrodirectively returning signals to the source from which they originated and not to other directions. The node acts as part of a retrodirective oscillating loop with the correct remote node and at the same time the node is part of a local retrodirective oscillating loop extending to the local station.

Amplification in each E-unit and in the subscriber stations provide part of the loop gain to develop the local and remote retrodirective loops. The operating frequency of the loops is selected by adjustment of the station frequency, in this case to $c+a$, for transmission which indirectly complements the station transmission frequency of the station operating with the remote node.

Figure 7:
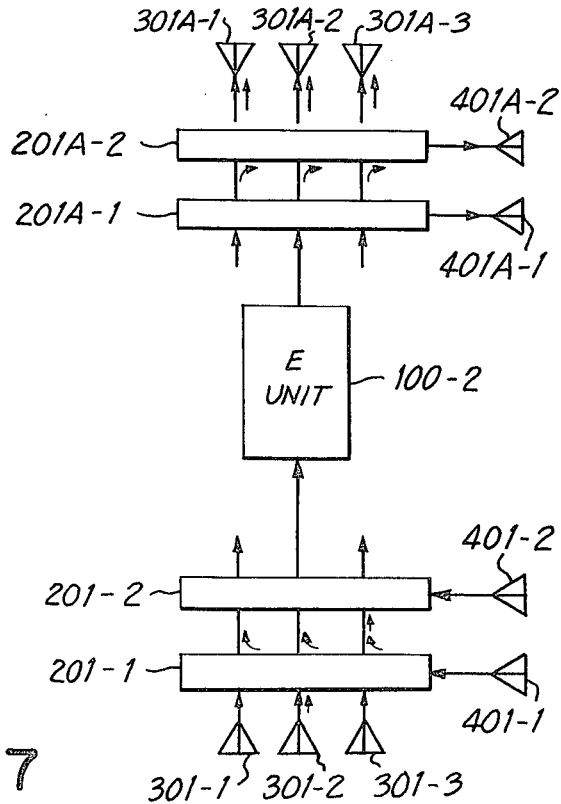
FIG. 7 illustrates one embodiment of the invention showing the use of retrodirective linkage between local and remote node stations.

Referring now to FIG. 7 there is shown one implementation of the manner in which retrodirective loops are established between node stations. Elements 201-1, 201-2 through 201-$n$ represent phased coupling lines connected to the receiving antenna elements of local antenna array 301-1, 301-2 through 301-$n$ and also to those of internodal antenna array 401-1, 401-2 through 401-$n$. Elements 201A-1, 201A-2 through 201A-$n$ are similar phased coupled lines connected to the transmitting local antenna array elements 301A-1, 301A-2 through 301A-$n$ and transmitting internodal antenna array elements 401A-1, 401A-2 through 401A-$n$. Receive and transmit antenna elements, such as 301-1 and 301A-1, 401-1 and 401A-1 may be the same antenna elements if the duplexer arrangement of FIG. 6 is used.

In accordance with the invention all signals which are received at a line coupling unit such as 201-1 from an internodal antenna element such as 401-1 are coupled off the line coupling unit 201-1 into lines coming from the local antenna array units 301-n. Energy coupling results in equal power for each local antenna line and the energy is directed toward the E-units 100-n and away from the antenna array elements 301-n. Excess power from antenna element 401-1 is absorbed at the far end of line coupling unit 201-1. Signals from local antenna array elements 301-n pass through the line coupling unit 201-1 without coupling energy in either direction along the line coupling unit. All of this energy is transmitted to the E-Units 100-n.

Output signals from the E-Units are transferred to line coupling units 201A-n. Unit 201A-1 has the same interline phase shifts $B_n$ that exist in line coupling unit 201-1. Antenna units 301A-n receive energy from E-Unit 100-n, which passes through line coupling units with minimal loss. However, energy from E-Unit 100-n, which is destined for antenna unit 401A-n is coupled onto unit 201A-n and travels through its phase determining units to antenna unit 401A-n.

As described in more detail with reference to FIG. 6 signal energy from any E-Unit 100-n may be received at any antenna element 401A-n because such energy is coupled to all line coupling units 201A-n. However, only certain of these signals will add in phase at a particular antenna element. 401A-n. For example, signals originating from antenna element 401-2, which passes through coupling unit 201-2 will, when properly processed in E-units 100-n and when traveling through coupling unit 201A-2, always add in phase at antenna element 401A-2. Signals which add in phase are enhanced by a factor of n over those which do not, n being the number of elements in the local antenna array 301-n. In particular, signals originating at local antenna array elements 301-n cannot add in phase at any antenna array element 401A-n and will therefore be effectively suppressed. In addition, these signals will be randomly phased from one antenna array element 401A-n to another and thus radiation caused by these signals will be low level and scattered in direction.

Signals which are transmitted directly through the coupling units 201A-n to local antenna array elements 301A-n and which originate from local antenna array elements 301-n will be correctly phased to be retransmitted back to the originating local station. The E-units 100-n correctly invert the spatial phases of these signals and also transfer modulations with the remote station signals received from the internodal array 401-n in accordance with what has been described above and in accordance with the teachings in the parent application. Alternatively, signals originating from the internodal antenna array elements 401-n from a given source will arrive at a given E-Unit 100-n input at various phase angles for two reasons. The first is that the signals from such a source will arrive at the antenna at various phase angles $\phi_n$, because of the spatial direction of the source. Only when the source is directly broadside will these signals add in phase. The second reason is that the phase delays through the several coupling units 201-n will be different for each internodal array element 401-n, including signals from the broadside direction. The sum of the signals arriving at random phases at the E-unit 100-n will tend to sum to zero, nearly eliminating the signals at this point. Signals not eliminated will cause signal energy to appear at antenna elements 301A-n which are at random phase differences with respect to one another, and thus will be scattered in all directions and be at low level.

Therefore, in accordance with the invention, it can be seen that the operation of the system of line coupler units 201-n and 201A-n, when properly phase adjusted, will cause the desired local and internodal signals to be properly enhanced in the correct direction, while at the same time suppressing undesired signals, thus permitting the establishment of local and internodal retrodirective loops.

Figure 8A:
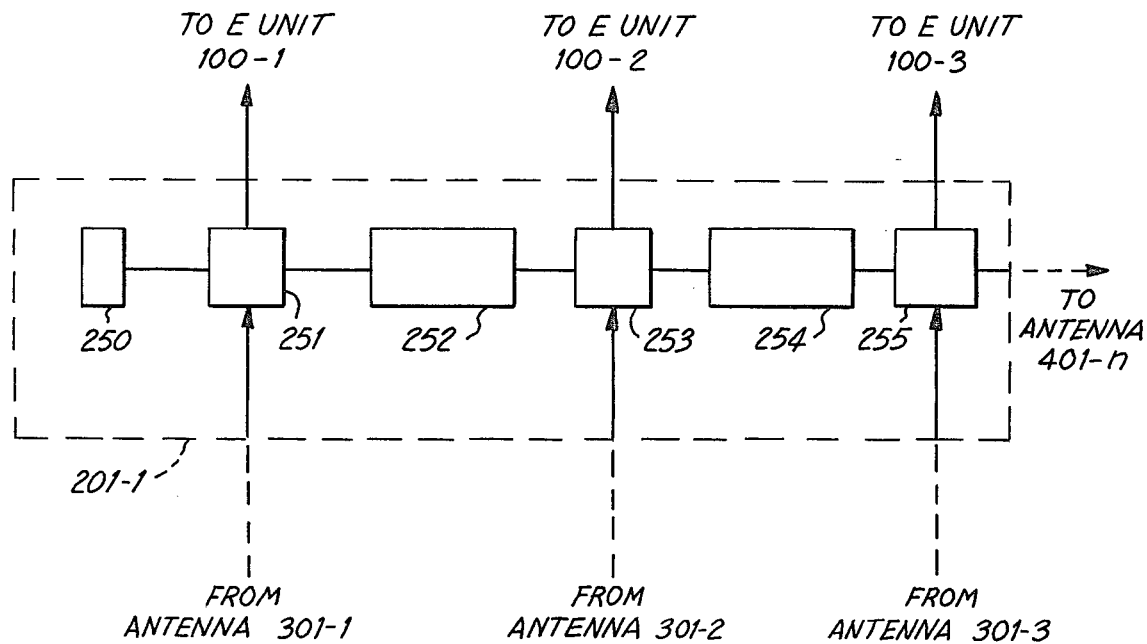
FIGS. 8A and 8B illustrate, in greater detail, the embodiment shown in FIG. 7.
Figure 8B:
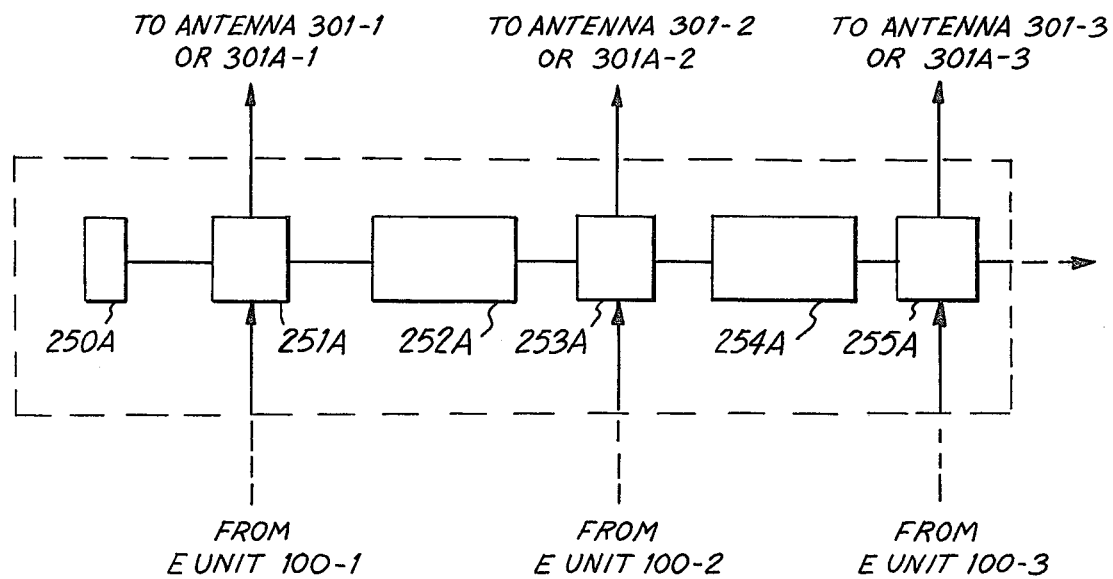

Referring now to FIG. 8A there is shown a phased coupling line 201-n in greater detail. Element 250 is an energy absorption unit. Coupling units are shown as elements 251, 253 and 255 and phasing units are shown as elements 252 and 254. It is, of course, understood that in this example three array elements 301-1, 301-2, and 301-3 are coupled with one array element 401-n. Coupling units 251, 253 and 255 connect with either antenna element 301n, E-units 100n, or other phased line coupling units 201-n. Phasing units 252 and 254 are either fixed or adjustable phase units which determine relative phase between coupling units. The phase unit may be constructed from different lengths of coaxial cable or from wave guide depending upon the frequency of operation. Any other suitable form of phase shifter may be used. The same form of Coupling line may be used for elements 201-n and 201A-n except that the coupling units 251, 253 and 255 must be different. This follows from the fact that the signals must flow from antennas 401-n to the E-units 100-n, for the case of unit 201-n, while in the case of the 201A-n units the signals must flow from the E-units 100-n to the antenna elements 401A-n. The 201A type phased coupling line is shown in FIG. 8B. Phase units 252A and 254A are of similar design and function as units 252 and 253 shown in Fig. 8A.

Figure 9A:
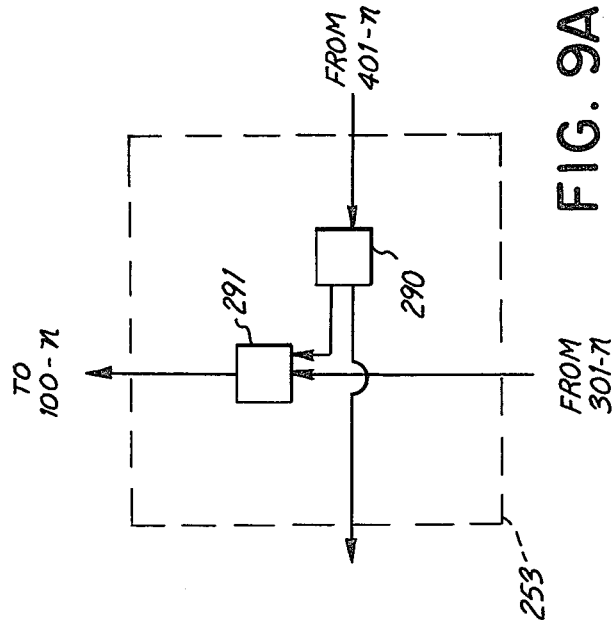
FIGS. 9A and 9B illustrate still further detail of the embodiment of the invention shown in FIG. 7.
Figure 9B:
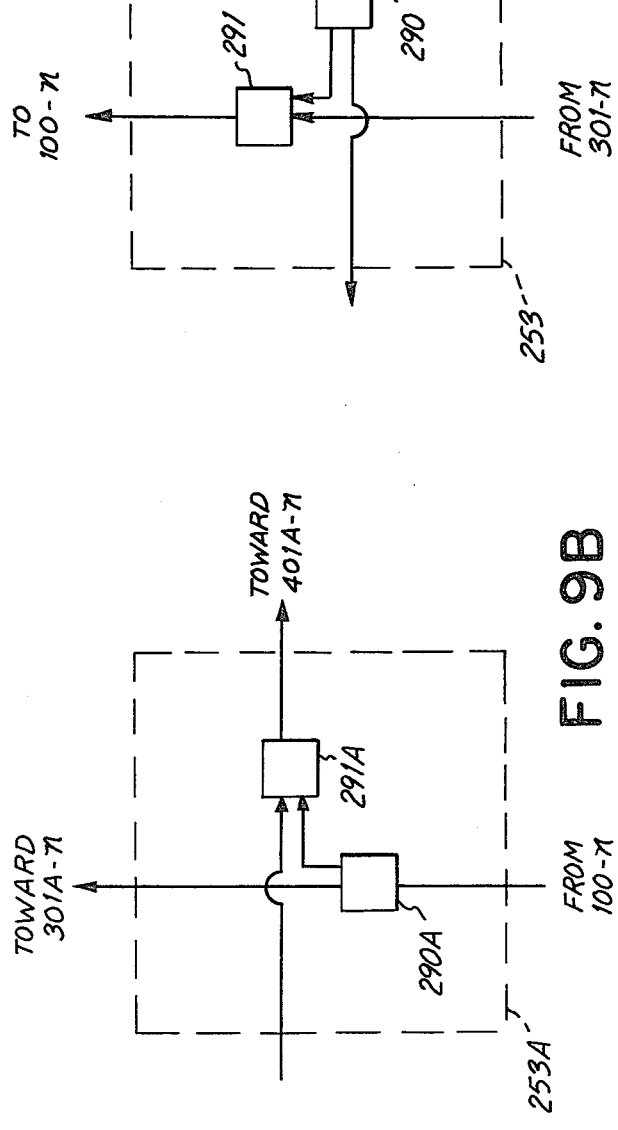

The coupling unit for a 201-n line unit is shown in Fig. 9A. Energy from the direction of the 401-n antenna array element is divided in unit 290, the main portion of the energy is sent to the next adjacent phase unit (such as 252), while the other part is sent to unit 291. This unit combines this power with that from antenna element 301-n (for example 301-2), and the combined signal is sent to the E-Unit 100-2 (in this case). This power is fed to unit 253A (FIG. 9B) and in particular to unit 290A which divides it so that most power flows toward antenna element 301A-2. The other part is fed to element 291A, which combines this power with other power received from adjacent phase unit 252A and sends it toward antenna element 401A-n. It will be seen that coupling units 253 and 253A, FIG. 9A and 9B respectively, are identical when one of them is rotated 90°. Furthermore, it should be understood that the coupling units may be made from a properly designed directional coupler, particularly at higher microwave frequencies.

The type of node station just described permits each node automatic access to a plurality of other nodes and possibly to all nodes in the system network depending on system design and the field of view of each internodal antenna array. A primary advantage of the node station of the instant invention is that the number of channels required for internodal traffic is greatly reduced. More particularly consider that the number of simultaneous paths between p nodes is $p(p-1)/2$. Thus, one frequency channel per path can service $p(p-1)$ stations located in the areas surrounding these p nodes. To visualize what the instant invention may accomplish in terms of servicing subscriber stations, consider the following examples:

| p nodes | s-station subscribers |
|---------|----------------------|
| 10      | 90                   |
| 100     | 9900                 |
| 1000    | 999000               |

The number of users s can be further expanded by providing additional channels c per path. Then s=cp (p-1), and

| p nodes | c channels per path | s stations |
|---------|---------------------|------------|
| 10      | 10                  | 900        |
| 30      | 30                  | 26100      |
| 100     | 100                 | 990000     |
| 1000    | 100                 | 99,900,000 |

It is of course understood that because the internodal paths lie in different directions, the channel frequencies used between them can be reused.

Thus, in accordance with the instant invention, an enormous population can be serviced with a hundred or so channels. The subscriber addresses are provided by a combination of receive/transmit offset designation K and a channel designation '1. Therefore, addresses a=r k and if r=k=1000 a=1,000,000.

These combinations are selectable by the calling station where each node will be given an offset address and each station within the local nodal area will be given a calling address which comprises the offset corresponding to its node and the channel designator. Stations lying at different directions can be given channel designators within the same voice channel without causing interference which of course saves additional spectrum space.

Described herein with reference to FIG. 5 is the node station which functions to establish retrodirective loops and transfer modulation between subscriber stations. The node stations described in detail in the parent application required both a modulation signal processor and a control carrier processor for each communication channel per antenna element. What will be described below is a sampled array node station which only requires a modulation signal processor and a control carrier processor for each communication channel in a particular node station. The sampled array node station is further compatable with the internodal array node station described above which provides retrodirective loops between subscriber stations and node stations.

Figure 10:
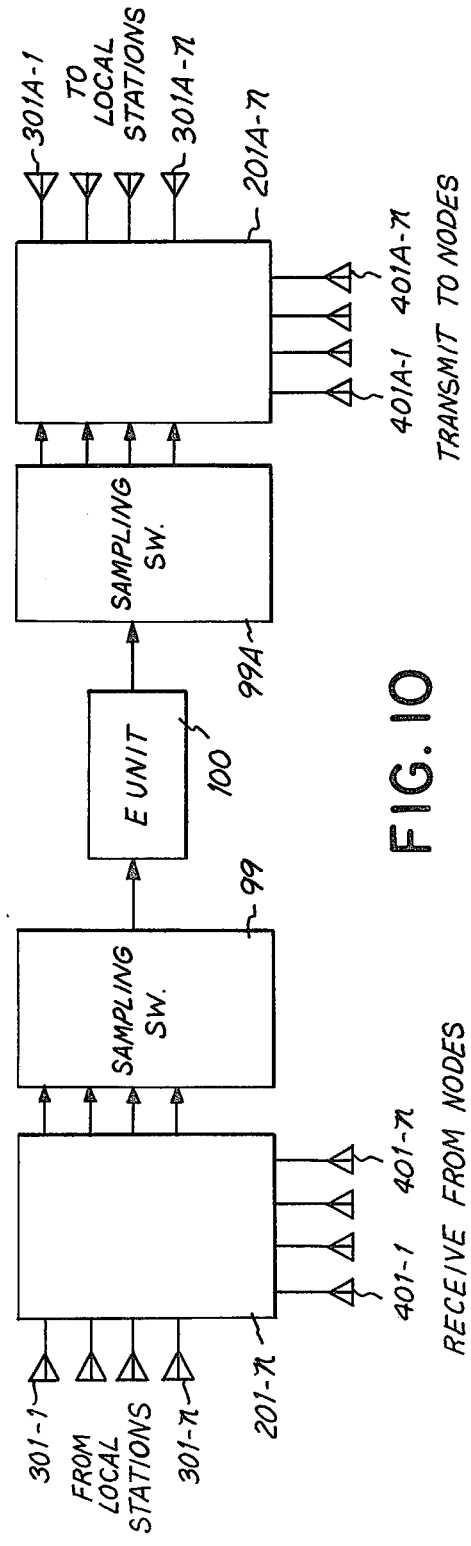
FIG. 10 is a simplified block diagrammatic representation of the sampling array node station in accordance with the instant invention.

The principle of the sampled array node station is based on the fact that each element of the node station is not required to be connected full time to provide its necessary function, which is to radiate correctly phased signals with respect to signals received by that element and which are properly processed by the node before retransmission. Referring now to FIG. 10, a single E-Unit 100 may be connected sequentially to the output of coupling units 201-n (FIG. 7) and to the inputs of coupling units 201A-n through sampling switch 99 on the input to the E-Unit and sampling switch 99A operating on the output of the E-Unit. As will be described more fully below corresponding switch elements in the sampling switches 99 and 99A connect one receive element with its corresponding transmit element.

The rate of change of the phase angle on each antenna element from each subscriber or node station is very low even for mobile stations. Therefore, the sampling rate provided by switches 99 and 99A can be very low. The rate must be high enough in each communication channel, so as not to affect the highest modulation caused frequency change in that channel. In this way, modulation signals can be correctly reconstructed in a narrow band pass filter at each station from sequentially phased signals without loss of gain. The sampling rate at each antenna element must therefor be n $f_{mc}$, where $f_{mc}$ is the highest modulation caused frequency change per channel and n is the number of sequentially sampled elements per modulation frequency cycle. If only one E-Unit 100 is used per node, n equals the number of elements in the array. For example, if $f_{mc}$ is 12 Khz, which is typical of FM voice transmission and n is 30, the sampling rate will be 30×2000=360 Khz.

The operation of the sampled array node of the instant invention requires deriving spatial phase differences between adjacent antenna elements. The value $\Delta\phi$, for example, remains constant for signals received from a given station (such as EAST) for a given modulation channel. In order to derive spatial phase differences sampling switch 99 is required to provide a simultaneous output from the element n-1 when also providing an output from element n. The phase difference $\Delta\phi$ is that used to adjust phases in the channel unit (described below) to compensate for the successive sampling of the antenna elements, thus permitting the correctly directed signals to be processed by the E-Unit.

Figure 11:
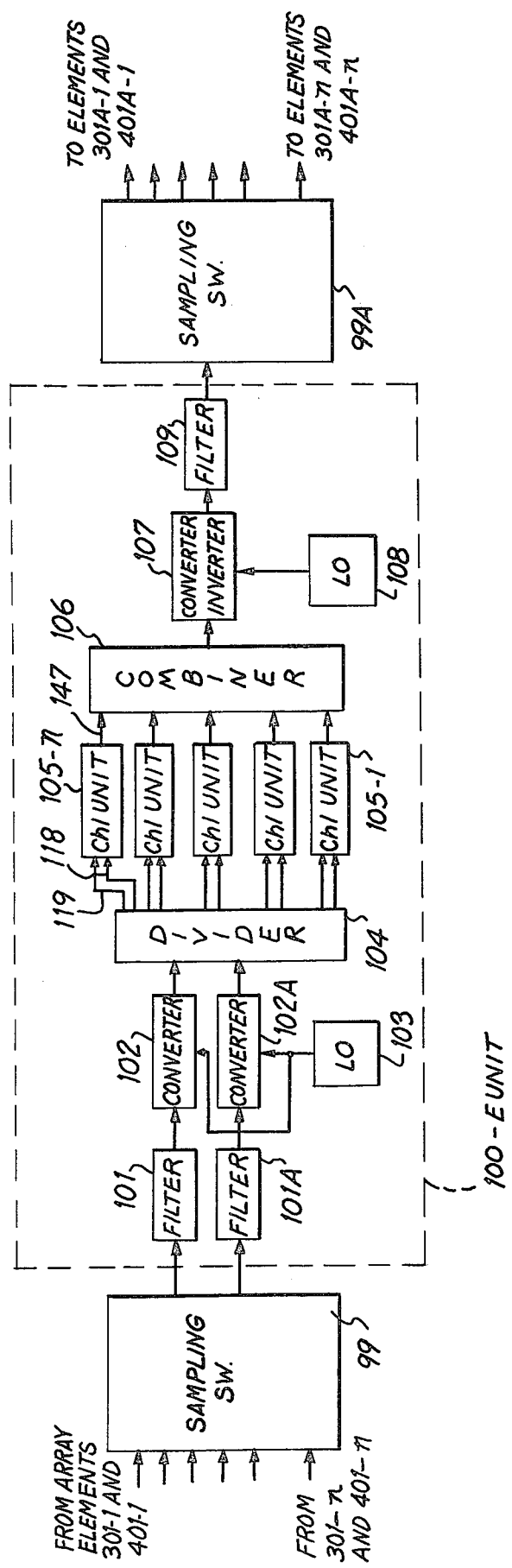
FIG. 11 illustrates, in block diagram form, an electronic unit for use in the embodiment of FIG. 10.

FIG. 11 illustrates a typical E-unit 100 for operation in a sampled array node station. Although the E-Unit in FIG. 11 is somewhat different than the E-Units described above it is to be understood that it operates on the same principles as the prior E-Units as will become apparent from the following discussion. As described above sampling switch 99 samples the nth and the nth-1 antenna element. The output of the sampling switch is applied to an RF bandpass filter 101 which selects the proper operating reception band for the n antenna element signal, while RF band pass filter 101A selects the proper operating reception band for the n−1 element signal. Converter 102 translates the RF signals to IF using signals from local oscillator 103 for the n element signal, while converter 102A provides the same function for the n−1 element signal. Power divider 104 applies the IF signals to channel units 105-1 to 105-m which will be described later in connection with FIG. 12. Briefly, the channel units separate the IF signals into independent modulation channels and perform modulation transfer while preserving correct spatial phase relationships. Combiner 106 performs the inverse function of divider 104 and brings the channels back together. Converter/invertor 107 inverts the spatial phase relationships using the signals from local oscillator 108. Filter 109 selects the proper transmission band, suppresses image frequency signals and applies its output to sampling switch 99A.

Figure 12:
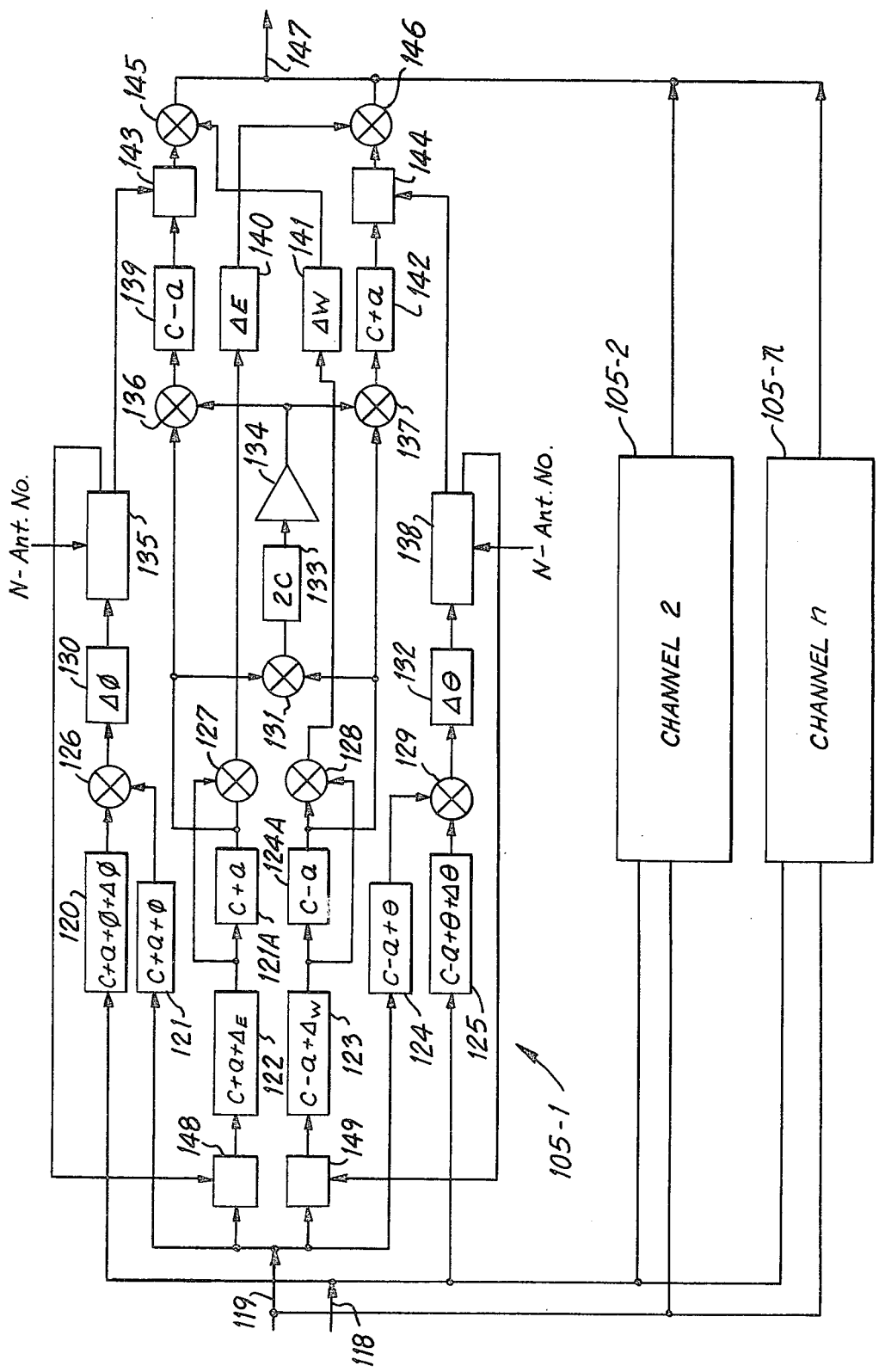
FIG. 12 illustrates, in block diagram form, a channel unit for use in the embodiment of FIG. 10.

Referring now to FIG. 12 there is shown the operation of the channel units 105-1 through 105-n. Channel unit 105-1 is shown in detail, while channel units 105-2 through 105-m are indicated in block form. Input lead 118 is corrected, via sampling switch 99 to antenna element 301-n−1 (for a particular period), while lead 119 is connected, via sampling switch 99, to element 301-n. The angular argument of the signal received from the East station on lead 118 is c+a+-

ΔEast+∅+Δ∅ and the signal received on lead 119 is c+a+ΔEast+∅. The difference Δ∅ is maintained essentially constant, regardless of the value of n between two adjacent antenna elements. The reason that this is so is because the relative angular motion of the East station with respect to the node is zero for fixed stations and extremely small for most moving stations, for periods in the order of 0.1 millisecond, as are of consideration here. Use is made of this effect in the design of the present system, and is true for all the channel units 105-1 through 105-n. Because of this effect, the sampling rate of switch 99 as stated before, can be as low as $nf_m$.

Lead 118 is connected to narrow band pass filters 120 and 125 which pass c+a+∅+Δ∅ and c−a+θ+Δθ respectively, which are the carrier frequencies derived from the antenna elements 301-n−1 and arise from a particular pair of stations, East and West, using this particular channel 105-1. Lead 119 supplies signals to narrow band pass carrier filters 121 and 124, which pass signals of frequency c+a+∅ and c−a+θ, which are carriers from East and West stations respectively and which are received on element 301-n. Lead 119 also conveys modulated signals via phase adjuster units 148 and 149 to band pass filters 122 and 123 which pass modulated signal c+a+ΔEast and c−a+ΔWest from East and West stations respectively.

The output of filters 120 and 121 are mixed in mixer 126, creating lower sideband product v=x sin Δ∅, which is selected by filter 130. The amplitude x is made nearly constant over a wide amplitude range by limiting action on the signals supplied to mixer 126. The output of filter 130 feeds processor 135 which first linearizes the input voltage v over the interval of Δ∅ from minus 90° to plus 90°, next the linearized voltage is multiplied by a voltage the value of which is determined by the number of the switch element on switch 99 being connected during a given switch interval, with the switch element number being with respect to a fixed reference initial element. This switch element value (n) changes directly as the sampling switch 99 position changes. The resulting product, directly proportional to NΔ∅, is the output of processor 135, and is used to control the phase shift of phase adjuster units 143 and 148. In this way, the carrier c−a from filter 139 will be successively given spatial phase 0, Δ∅, 2Δ∅, 3Δ∅, —nΔ∅, while antenna elemets 1, 2 3—n+1 are successively connected. This carrier is modulated by Δw in mixer 145 and the signal c−a+ΔWest+nΔ∅ is presented to lead 147 for transmission through element n in switch 99A. After inversion (107 in FIG. 11) this signal will be sent to the East station as c+a+ΔWest−nΔ∅. Because the signals presented to the successive antenna elements have been phased with successively greater phase shifts which are multiples of the direction angle received from the East station, these signals will arrive in phase and will pass through a low-pass detection filter which integrates the signal with respect to noise. This will happen only at the East station and other station sufficiently removed in directions will not receive this signal modulation.

The second output of processor 135 controls phase shift setting phase adjuster 148. This unit adjusts the phase of the input of modulation pass band filter 122. The dephased carrier c+a passes through filter 121A, which then mixes with the dephased modulated signal c+a+ΔEast in mixer 127 to form modulation signal ΔEast, which passes through low pass filter 140. Signals not in the direction of the East station, being not of steady phase, will not pass filter 140 and will be eliminated. In a similar manner, the output of processor 138, which is identical to processor 135, adjusts phase adjuster 149 to dephase signals from the West station, so that they will be able to pass through modulation bandpass filter 123. Mixer 129 and filter 132, processor 138 and phasing units 144 and 149 perform the same function for carrier signals from the West station as did mixer 126, etc., for the East station. In this case, the carrier signals of phase differential Δθ are derived from narrow pass filters 124 and 125. The output on lead 147 resulting from these operations is c+a+−ΔEast+(∅=nΔθ) resulting in c−a−ΔEast−nΔθ being sent from antenna element n via switch element 99A (FIG. 11).

The outputs c+a and c−a from 121A and 124A respectively are mixed in mixer 131 to form high sideband product 2c which is filtered in filter 133, which is a narrow band pass filter feeding amplifier 134. This amplifier supplies part of the loop gain enabling both loops to form between the node station and the East and West stations. Unless conditions are proper to provide sufficient gain in both loops no loops will form. Mixing in mixer 131 insures both loops will form together, not separately. The output of amplifier 134 will be mixed with c+a in mixer 136 to form c−a, which is selected by lowpass filter 134 to be processed for transmission back to one station and the signal mixed in mixer 137 with c−a causes product c+a selected by low pass filter 142 for retransmission to the other station. Signal c−a, as already stated, is phase shifted properly for the selected antenna element by phase shifter 143 and signal c+a is phase shifted by phase shifter 144. The output of filter 122, containing modulation ΔEast is mixed with carrier from filter 121A in mixer 127 to provide modulation component ΔEast. This component modulates c+a+nΔ∅ in mixer 146, which ΔWest, formed by mixing the outputs of filter 123 and 124, modulates c−a+nΔ∅ in mixer 145. The operation of forming the required loops transferring the modulation and directing the signals properly for the given channel has now been completed.

FIG. 13 shows the operation of processor unit 135 (and 138) in greater detail. Processor 135 (and 138) has the responsibility of providing correct phasing signals to the transmitting elements, as they are successively switched. The phase signal Δ∅ is a slowly changing, near dc, voltage of either polarity. It is applied to linearizer 150, which increases the voltage at the higher levels of either polarity to produce an output signal which varies linearly with the actual phase difference output of mixer 126 (or 129), between plus and minus 90°. The output of linearizer 150 is multiplied in amplitude multiplier 152, with a voltage the value of which is directly proportional to the antenna element position number n (generated by processor 151) which has been connected by switch 99, with the multiplication preferably being performed by a bipolar gain controlled amplifier (not shown). The signal output of multiplier 152 is processed in processor 153 to provide a suitable signal for the phase adjusters 148 and 143. In some instances, it is desirable that the phase adjustment provided by 143 and 148 be opposite in sense; that is, one will be positive going and the other will be negative going. This phase inversion may be provided instead by converter 107 (FIG. 11). When inversion is required control signal inverter 154 will invert the amplitude it receives and provide it to phase adjuster 143.

The phase adjusters 143, 144, 148 and 149 are equipped to respond immediately to the control signals from processors 135 and 138 by increasing or retarding the phase of the input signal to them by the required amount. If the inputs to processor 135 are converted to a binary digital code, then the functions of units 150, 151, 152, 153 and 154 are performed by digital components, which are capable of digital multiplication. The resultant outputs may be left in digital code form, if the actuators 143, 148, 144, 149 are equipped to respond directly to digital code signals.

In accordance with still another aspect of the invention there is described below another embodiment of the sampled array node element which provides better signal to noise performance and requires less transmit power. Its operating capability is equal in all respects to an n element retro-array having E-Units in each array antenna element pair, but requires only one E-Unit per antenna array.

In operation a recirculating broadband delay line sums up all signals received by an array element between periods during which the element is not connected to the node electronics. When the element is switched in, the accumulated signal is switched into the E-Unit. This signal has a higher signal-to-noise ratio because of the signal integration. Also on transmission, the output of the node electronics (E-Unit) is switched to successive elements. This node uses a circulating delay line to recirculate the sample signal between samples, so that a continuous signal is radiated by all elements.

Referring now to FIG. 14 there is shown a block diagram of an integrating sampling array node station. Antenna elements 301-1 through 301-$n$ are elements of the receiving array and antenna elements 301A-1 through 301A-$n$ are elements of the corresponding transmitting array. Element 301-1 is connected to a recirculating integrating system, consisting of summer 304-1, delay unit 305-1, and switch 306-1. A similar system is connected to each element 301-$n$. These integrating systems connect via switches 306-$n$ to E-Unit 100. Switches 306-$n$ perform the same function as sampling switch 99 in FIG. 12, as well as an additional control function for the integrating system.

More particularly signals from element 301-1 are periodically sampled by switch 306-1 for a period of one nth of the available time. All elements must be sampled within a period less than the shortest modulation period (for voice, less than 1/10 Khz). Thus, there are n−1 intervals during which the output of the receive antenna element 301-1 (or 301-$n$) is not being used. Switch 306-1 connects delay unit 305-1 to the output of summer 304-1 during these intervals. The delay unit interval is made to equal the interval T/n where T is the period between resamplings of the array. Then for n−1 of these intervals the delayed output of 304-1 adds to the new input, so that after n intervals a steady signal will be enhanced by a factor n whereas a noise signal will tend to average zero, resulting in a power signal to noise enhancement of n. When a sample is to be delivered to the E-unit, a switch 306-1 disconnects delay unit 305-1 from the output of summer 304-1 and connects that output to E-Unit 100. After the sampling interval, switch 306-1 disconnects the E-Unit path and reconnects the delay unit 305-1 input to the summer output 304-1 and the operation starts over again.

The transmit antenna elements 301A-$n$ are each connected to E-Unit 100 via recirculating systems consisting of 310-$n$, 311-$n$ and 312-$n$. These units operate together to provide a sustained, periodically updated signal to transmit element 301A-$n$. Switch 310-$n$ takes the place of sampling switch 99A of FIG. 13. Switch 310-$n$ connects a sample of the output of E-Unit 100 for a period T/n where as before T is the longest allowable interval for unchanged modulation signal and 1/n is the time allowed to the nth array element. The output of the 30 E-Unit is, of course, a composite of the signals from the several channel units, and is suitably offset in frequency to a transmit band. The sample is applied to summer 312-$n$ which provides an input of the delay unit 311-$n$, the delay time of which is T/n. The switch 310-$n$ then opens the connection to the E-Unit 100 and connects the delay unit output to summer 312-$n$. Summer 312-$n$ provides an output to the antenna element 301A-$n$, which is the sum of the successive time samples of the original sample and the repeats. When the next sample is to be taken switch 310-$n$ opens the output of the delay line 311-$n$ and connects the output of E-Unit 100 directly to summer 312-$n$. After the sample interval the E-Unit path is opened and the delay unit output path is closed to the summer and the process is repeated as before. In this manner, the node transmits continuously n simultaneous signals for n elements, phased to be received in the various required directions.

Although specific embodiments of the invention have been shown and developed it should be understood that various modifications may be made without departing from the spirit of the claimed invention.

I claim:

1. A communication system having at least two node stations and at least one subscriber station associated with each node station, said communication system comprising, means for establishing a first retrodirective loop between one of said subscriber stations and its associated node station, means for establishing a second retrodirective loop between said two node stations, means for establishing a third retrodirective loop between the other of said subscriber stations and its associated node station and means for transferring information between said subscriber stations via said first, second and third retrodirective loops, said first, second and third retrodirective oscilating loops being interdependent and being established substantially simultaneously.

2. A node for use in a communications system including a plurality of subscriber stations, said node comprising a plurality of antenna means, each of said antenna means for receiving a first carrier signal of a characteristic frequency transmitted by a first one of said subscriber stations and a second carrier signal transmitted by a second one of said subscriber stations and having a frequency related to the characteristic frequency of said first carrier signal, a signal processor, first multiplexing means for successively coupling selected ones of said receiving antenna means to said signal processor, said signal processor receiving said first and second carrier signals to produce a third carrier signal at a particular frequency, a plurality of antenna means for transmitting said third carrier signal at a particular frequency to said first and second subscriber stations and second multiplexing means for successively coupling selected ones of said transmitting antenna means to said signal processor, whereby retrodirective oscillating loops are selectively established between subscriber stations and the node to permit communications between subscriber stations, said retrodirective oscillating loops being interdependent and established substantially simultaneously.

3. A node for use in a communication system in accordance with claim 2 wherein said signal processor includes a modulation processor and a control carrier signal processor, said first and second carrier signals each including modulation signals from said first and second subscriber stations, said carrier signal processor including means for generating said third carrier signal and said modulation processor including means for removing the modulation from said first and second carrier signals and for directing the modulation removed from said first carrier signal to said second subscriber station and for directing the modulation removed from said second carrier signal to said first subscriber station.

4. A node for use in a communications system in accordance with claim 3 wherein said first multiplexing means includes means for sampling said first and second carrier signals present at a selected one of said receiving antenna means for a predetermined interval of time, said node further including means for summing said first and second carrier signal samples during an interval in which said selected receiving antenna means is not coupled to said signal processor, and means for transferring said summed first and second carrier signal samples to said signal processor during the interval in which said selected receiving antenna means is coupled to said control carrier signal processor.

5. A communication system having at least two retrodirective node stations, at least one subscriber station associated with each retrodirective node station and a retrodirective communication link between said retrodirective node stations, said communication system comprising means for establishing a first retrodirective oscillating loop between one of said subscriber stations and its associated retrodirective node station, for establishing a second retrodirective oscillating loop between the other of said subscriber stations and its associated node stations, and for establishing a third retrodirective oscillating loop between said two retrodirective node stations, said first, second and third retrodirective oscillating loops being interdependent and being established substantially simultaneously, said third retrodirective oscillating loop conveying energy characteristic of said first retrodirective oscillating loop to said second retrodirective node and conveying energy characteristic of said second retrodirective oscillating loop to said first retrodirective node so that the energy characteristic of each of said retrodirective oscillating loops combine in each of said retrodirective nodes and means for transferring information between said subscriber stations via said first, second and third retrodirective oscillating loops.

6. A communications system in accordance with claim 5 wherein each of said retrodirective stations includes a plurality of antenna means, each of said antenna means for receiving a first carrier signal of a characteristic frequency transmitted by a first one of said subscriber stations and a second carrier signal transmitted by a second one of said subscriber stations and having a frequency related to the characteristic frequency of said first carrier signal, a signal processor, first multiplexing means for successively coupling selected ones of said receiving antenna means to said signal processor, said signal processor receiving said first and second carrier signals to produce a third carrier signal at a particular frequency, a plurality of antenna means for transmitting said third carrier signal at a particular frequency to said first and second subscriber stations and second multiplexing means for successively coupling selected ones of said transmitting antenna means to said signal processor.

7. A communication system in accordance with claim 6 wherein said signal processor includes a modulation processor and a control carrier signal processor, said first and second carrier signals each including modulation signals from said first and second subscriber stations, said carrier signal processor including means for generating said third carrier signal and said modulation processor including means for removing the modulation from said first and second carrier signals and for directing the modulation removed from said first carrier signal to said second subscriber station and for directing the modulation removed from said second carrier signal to said first subscriber station.

8. A comunications system in accordance with claim 7 wherein said first multiplexing means includes means for sampling said first and second carrier signals present at a selected one of said receiving antenna means for a predetermined interval of time, each of said retrodirective node stations further including means for summing said first and second carrier signal samples during an interval in which said selected receiving antenna means is not coupled to said signal processor, and means for transferring said summed first and second carrier signals samples to said signal processor during the interval in which said selected receiving antenna means is coupled to said control carrier signal processor.

9. A method for establishing a communications highway between at least two subscriber stations, with each subscriber station being associated with at least one node station, the method comprising the steps of; establishing a first retrodirective loop between one of said subscriber stations and an associated node station, establishing a second retrodirective loop between the other of said subscriber stations and an associated node station, establishing a third retrodirective loop between two node stations and transferring information between said subscriber stations via said first, second and third retrodirective loops, said first, second and third retrodirective loops being interdependent and being established substantially simultaneously.

10. A method for establishing a communications highway between a plurality of subscriber stations including the steps of; receiving, at a plurality of node receiving antennas, a first carrier signal of a characteristic frequency transmitted by a first one of said subscriber stations and a second carrier signal transmitted by a second one of said subscriber stations, said second carrier signal having a frequency related to the characteristic frequency of said first carrier signal, successively coupling selected ones of said node receiving antennas to a signal processor, receiving at said signal processor said first and second carrier signals and producing a third carrier signal at a particular frequency, transmitting from a plurality of node transmitting antennas said third carrier signal at a particular frequency to said first and second subscriber stations and successively coupling selected ones of said node transmitting antennas to said signal processor, whereby retrodirective oscillating loops are selectively established between subscriber stations to permit communications, said retrodirective oscillating loops being interdependent and established substantially simultaneously.

* * * * *